United States Patent
Pellizzer et al.

(10) Patent No.: US 11,477,185 B2
(45) Date of Patent: Oct. 18, 2022

(54) METHOD AND SYSTEM FOR SINGLE SIGN-ON AUTHENTICATION

(71) Applicant: Xiid Corporation, Cupertino, CA (US)

(72) Inventors: Guido Pellizzer, Lovere (IT); Federico Simonetti, San Jose, CA (US)

(73) Assignee: Xiid Corporation

(*) Notice: Subject to any disclaimer, the term of this patent is extended or adjusted under 35 U.S.C. 154(b) by 422 days.

(21) Appl. No.: 16/791,644

(22) Filed: Feb. 14, 2020

(65) Prior Publication Data

US 2020/0267139 A1 Aug. 20, 2020

Related U.S. Application Data

(60) Provisional application No. 62/806,654, filed on Feb. 15, 2019.

(51) Int. Cl.
*H04L 9/40* (2022.01)
*G06F 9/455* (2018.01)
*G06F 21/45* (2013.01)

(52) U.S. Cl.
CPC ...... *H04L 63/0815* (2013.01); *G06F 9/45533* (2013.01); *G06F 21/45* (2013.01); *H04L 63/0838* (2013.01)

(58) Field of Classification Search
CPC ............. H04L 63/0815; H04L 63/0838; G06F 9/45533; G06F 21/45
See application file for complete search history.

(56) References Cited

U.S. PATENT DOCUMENTS

| | | | | |
|---|---|---|---|---|
| 8,856,917 | B2* | 10/2014 | Das | G06F 9/452 713/151 |
| 2006/0288230 | A1* | 12/2006 | Crall | H04L 63/0838 713/183 |
| 2007/0157298 | A1* | 7/2007 | Dingwall | G06F 21/6218 726/8 |
| 2007/0174429 | A1* | 7/2007 | Mazzaferri | H04L 63/102 709/218 |
| 2012/0233678 | A1* | 9/2012 | Pal | H04L 9/321 726/7 |
| 2016/0261604 | A1* | 9/2016 | Pal | H04L 9/3228 |
| 2017/0142094 | A1* | 5/2017 | Doitch | G06F 21/41 |

* cited by examiner

*Primary Examiner* — Shanto Abedin
*Assistant Examiner* — Bruce S Ashley
(74) *Attorney, Agent, or Firm* — Jordan Powell

(57) ABSTRACT

A user may securely access a remote virtual machine (RVM) by authenticating with a single sign-on portal (SSOP) connected to a request collector. The request collector is connected to a remote access helper (RAH) associated with the RVM. Upon a user request from the SSOP, a one-time password (OTP) is generated by the RVM and the RAH sends an acceptance notice to the request collector. The request collector generates a payload containing a URL which is sent to the SSOP and connects to the URL downloading a file containing the OTP. The user then connects to and accesses the RVM using the OTP contained in the file.

20 Claims, 3 Drawing Sheets

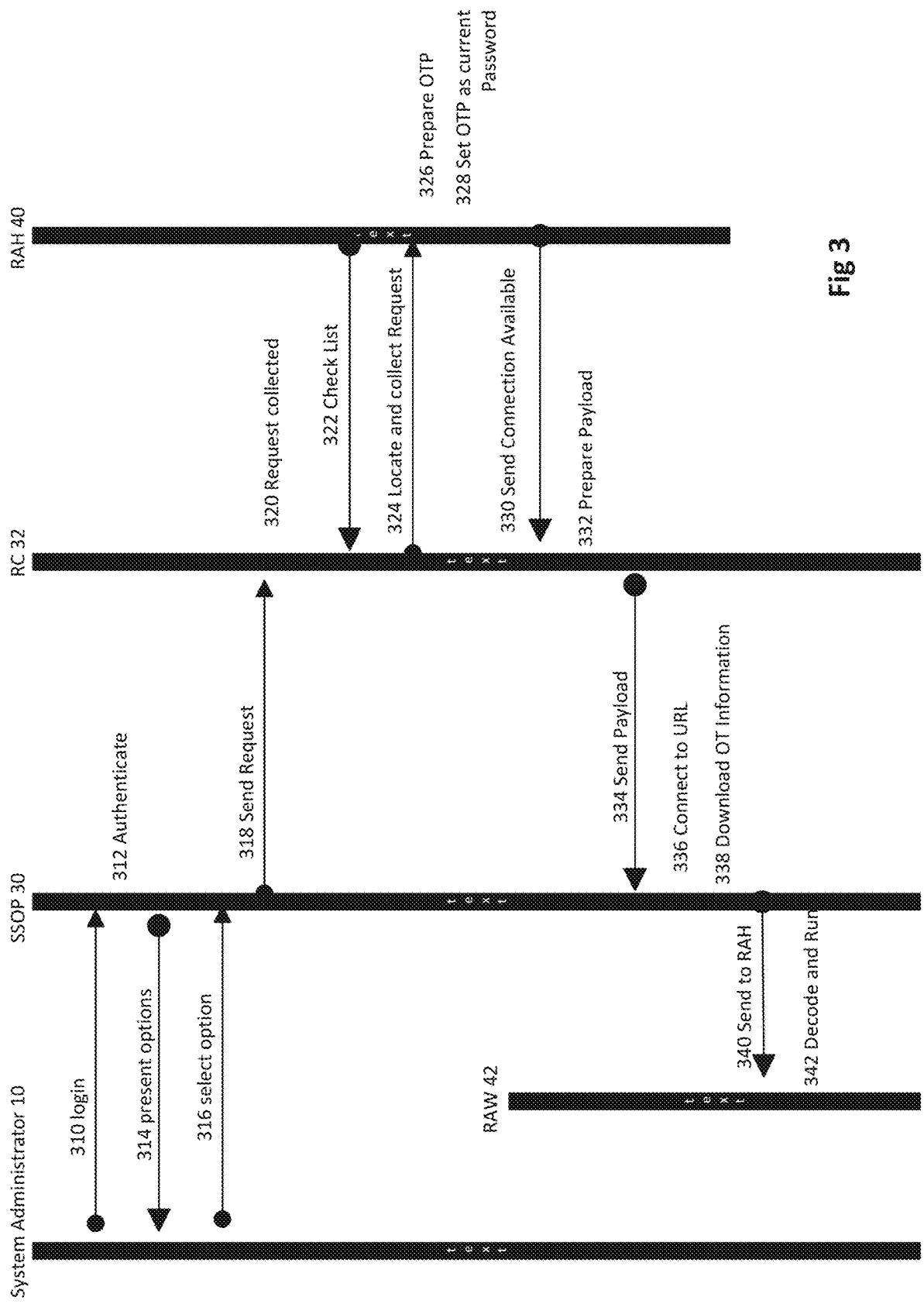

METHOD AND SYSTEM FOR SINGLE SIGN-ON AUTHENTICATION

BACKGROUND

This invention relates to secure communication over a non-secure channel such as the internet. Specifically, this invention relates to a system and method for securely connecting a user, such as a system administrator, to a remote virtual machine across a non-secure channel using a one-time password (OTP) from a single sign-on portal (SSOP).

Virtual machines (VM) are key elements in today's computing environment. A VM is an emulation of a computing system. Through using VM's, multiple operating systems can be run on the same computer hardware as well as real-time operating systems running on the same hardware as complex operating systems.

VM's are often run on computer hardware that is remote to a network to which the VM belongs. These VMs will allow access to system administrators who have accounts for administrative privileges. In other words, certain system administrators will have administrative privileges to access and manage the operation of the VM.

As indicated, VM's are often remote to a network and must be accessed by the system administrator across unsecure channels. Traditionally, a system administrator will connect to the remote VM to manage them through one of two protocols:
   a. RDP (Remote Desktop Protocol if the remote VM system is Windows; and
   b. SSH (Secure Shell) if the remote VM system is Linux, Max (for music and multi-media) or an otherwise Posix-compliant system (Posix is the IEEE Computer Society standard for maintaining operability between operating systems). Recent editions of Windows now support the SSH protocol.

Typically, system administrators log into the remote VM(s) using login credentials that include a username and password. A One-Time Code (OTC) received from a token code generator may also be incorporated along with the username and password. System administrators will generally utilize, for security purposes, different passwords for each of the different VMs that they must remotely access. Varying usernames are also utilized at times for each different VM. The assumption for utilizing separate passwords and even separate usernames is that if a thief is able to steal or access the username and password of one of the VMs in the system administrator's system, all other VMs in the system remain safe.

It should be recognized that there is a potentially large number of VM login credentials that the system administrator must utilize among many VMs. Because of the large number of credentials, system administrators will often:
   a. Not change the password very often, and even less frequently the username; and
   b. Maintain a file or spreadsheet of the account-password pairs and store such files or spreadsheets on the system administrator's device which is utilized to access the remote VMs.

Cleary the problem with maintaining passwords and usernames for each VM in the administrator's system is, as relates to a. above, if the passwords and usernames are not changed and one is stolen, a thief can rely on the stolen credentials to access the VM at will over a long period of time; and, as relates to b. above, if a hacker successfully obtains access or obtains ownership of the file or spreadsheet, the hacker instantly can take control and manage each of the remote VMs.

It follows that the present state of the art leaves secured VMs in an administrator's system unsafe and open to theft and attack. There is therefore a significant need for a more secure way to manage remote secure VMs in a system that is strong enough to prevent loss of credentials and loss of control of the VMs. At the same time, a more secure management scheme must be easy enough that the system administrator does not need to store the access data of the remote secure VMs anywhere.

SUMMARY

According to at least one embodiment of the present invention, a method is presented and claimed whereby a system administrator can access remote VM systems in order to manage the systems. The system administrator accesses the VM(s) through conventional remote management tools but then utilizes a one-time password as the only credential for authentication with the VM(s). The system administrator utilizes a Single Sign-On for ease of operation.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the claimed invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." "Fig" or "FIGS." herein) of which:

FIG. 3 illustrates a step diagram of a method pursuant to a preferred embodiment of the present invention.

DETAILED DESCRIPTION

While some embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

For purposes of this Detailed Description, the following abbreviations shall have the associated meanings as listed below.

OTP—OTP means one-time password and is any type of one-time password algorithm including, but not limited to, HOTP or TOTP, where HOTP stands for HMAC one-time password where HMAC is a key-hash message authentication code or hash-based message authentication code and TOTP stands for Time-based One-Time Password algorithm and is an algorithm that computes a one-time password from a shared secret key and the current time. TOTP has been adopted as Internet Engineering Task Force[1] standard RFC 6238,[1] is the cornerstone of Initiative For Open Authentication (OATH), and is used in a number of two-factor authentication systems. Any attempts to reuse the same HOTP or TOTP code will result in an unsuccessful user verification.

RDP—RDP stands for Remote Desktop Protocol and is a protocol designed by Microsoft to allow remote management of Windows systems.

SSH—SSH is a standard protocol typically used to manage Unix, Linus, Mac, or any other Posix-compliant system and is also recently supported by certain Windows editions.

SSOPortal—SSOPortal stands for Single Sign-On Portal. SSOPortal is a web application that allows access control of multiple related, yet independent software systems, including for purposes of the present invention, multiple VMs. Typically SSOPortal identifies a user once, and after successful authentication, allows such user to access several remote resources, such as the secure remote VMs, without having to authenticate again to each one of them.

Figure 1:
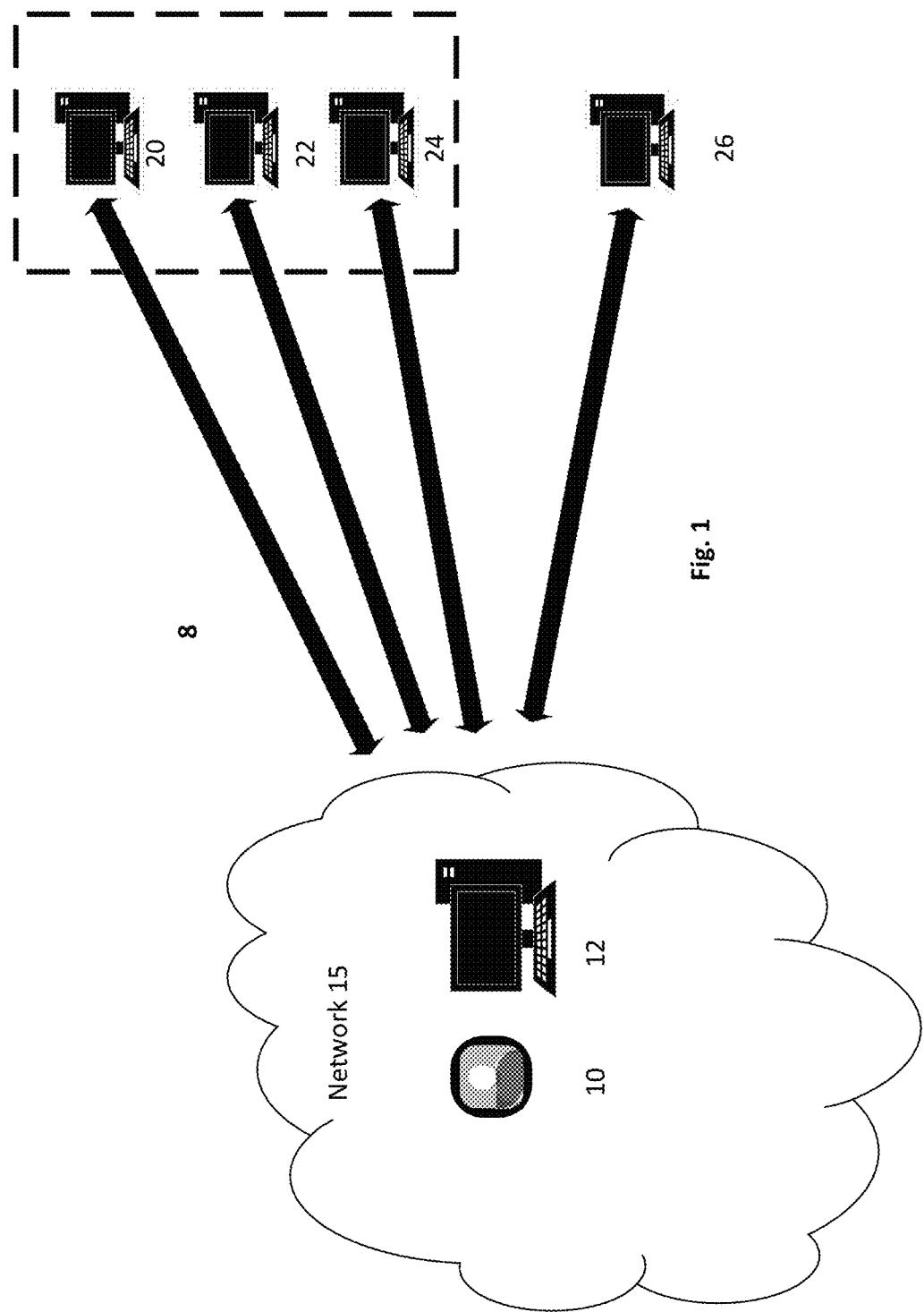
FIG. 1 illustrates an example of a system of remote virtual machines connected to a user device such as a system administrator's computing device.

FIG. 1 shows a diagram of an environment 8 within which the present invention will be explained. Specifically, a user, such as system administrator 10, is utilizing an administrator computing device or server 12 within a network 15 of an organization. System administrator 10, through administrator server 12, is communicating, in FIG. 1, or may communicate, with at least one virtual machine (VM), including VM 20, VM 22, VM 24 and VM 26.

One having ordinary skill in the art will recognize that a virtual machine is an emulation of a computer system. A VM has an architecture and the functionality of a physical computer. Within the concept of a virtual machine there is a system virtual machine and process virtual machine. The system virtual machine is designed to emulate a computer that executes an entire operating system. A process virtual machine executes computer programs in a platform-independent environment. For instance, there may be a need to operate entire computers running separate operating systems, yet the cost of separate physical computers may be unreasonable given the circumstances. In such a situation, several different virtual machines may be loaded onto a single physical computer hardware allowing each virtual machine to run its separate operating system. Similarly, a process virtual machine can be loaded onto a physical computer system having multiple virtual machines.

Referring again to FIG. 1, the concept of multiple virtual machines is shown where VM 20, VM 22 and VM 24 are a part of a physical computer 30, whereas VM 26 is shown operating on a separate system (not defined).

One having ordinary skill in the art will further understand that system administrators will access the virtual machines to manage the operations of the virtual machines, a task not open to all individuals in Network 15. Even among system administrators, access to the operation of the virtual machines is generally limited to a few high level administrators who are authorized to do so.

Figure 2:
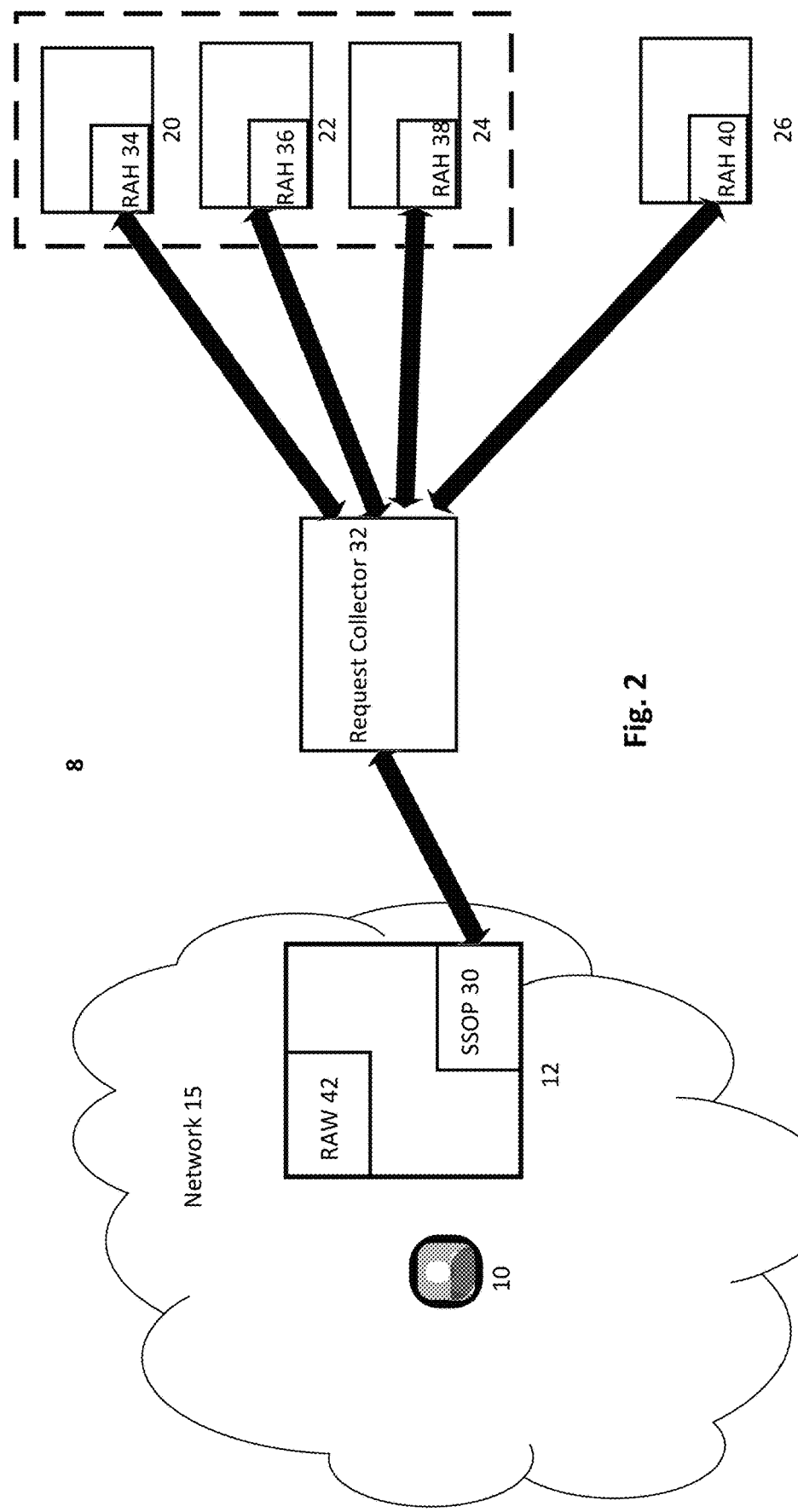
FIG. 2 illustrates an example of the system of FIG. 1 with elements of the present invention incorporated therein pursuant to a preferred embodiment of the present invention.

FIG. 2 expands on the environment 8 of FIG. 1 to show elements of a preferred embodiment of the present invention. In environment 8 of FIG. 2, server 12 includes a single sign-on system which, pursuant to a preferred embodiment of the present invention, is an application called Single Sign-On Portal 30, or SSOP 30, within a browser. It should be readily understood that a single sign-on (SSO) is a system allowing an operator of the SSO to access a connected system of applications or servers by logging on once, where each of the applications or servers have their own login requirements. This allows the user/operator to avoid logging into each of the separate applications/servers separately.

In addition to SSOP 30, new elements within environment 8 pursuant to the present invention that are found in FIG. 2 and not in the generalized FIG. 1 include a middleware called Request Collector (RC) 32 and, for each of VM 20, VM 22, VM 24 and VM 26, a Remote Access Helper designated as RAH 34 (associated with VM 20), RAH 36 (VM 22), RAH 38 (VM 24) and RAH 40 (VM 26). The operation of each of these new elements will now be described with reference to the step diagram of FIG. 3.

Referring now to FIG. 3 with reference to FIG. 2, at step 310 system administrator 10 authenticates with SSOP 30 by logging into SSOP 30 on system administrator's server 12. Login credentials will normally be a username and password but other forms of credentials are contemplated by the present invention. At step 312 SSOP 30 authenticates the login credentials of system administrator 10. Upon successful login with SSOP 30, at step 314 SSOP 30 will return to the system administrator through a display, although other means are contemplated herein, a list of resources that can be accessed through SSOP 30. These resources can be utilized through the single sign-on method of SSOP 30 without logging into/re-authenticating each resource separately. Some or many of the resources presented by SSOP 30 to system administrator 10 may be remote systems or remote virtual machines such as VM 20, VM 22, VM 24 and VM 26. Therefore, pursuant to one preferred embodiment of the present invention, VM 20, VM 22, VM 24 and VM 26 are presented to system administrator 10 as options for resource access.

The options for resources presented to system administrator 10 may be presented in any recognized manner. In the preferred embodiment of the present invention, the options are presented to system administrator as icons which can be selected by clicking on them using a mouse or other common means of selection.

Once the system administrator 10 has clicked on at least one of the options for resources presented by SSOP 30 (step 316), SSOP 30 sends a request to RC 32 at step 318. This request from SSOP 30 to RC 32 will contain information which identifies the selected resource that system administrator 10 is seeking to access. Other information in the request may include identification of the SSOP 30.

RC 32, as its name implies, collects requests from SSOP 30. It should be noted that RC 32 may be associated with multiple single sign-on portals including SSOP 30. Therefore, all requests for access to the available resources will be collected in RC 32 at step 320.

Each of the remote access helpers in remote locations such as VM 20, VM 22, VN 24 and VM 26 (RAH 34, RAH 36, RAH 38 and RAH 40 respectively), connect to RC 32 in order to collect from RC 32 the various requests for resources. Therefore, referencing RAH 40 for exemplary purposes, RAH 40 at step 322 checks the list of requests collected by RC 32 to determine if any of the requests collected by RC 32 are requests for access to RAH 40. It may be noted that, in the alternative, RC 32 may be designed to proactively send to RAH 40 any request for VM 26 resources collected by RC 32. This alternate approach is also contemplated by the present invention. However, for this present example, RC 32 collects the requests for retrieval by RAH 40 or other RAH. RAH 40 monitors the collected requests within RC 32 in order to collect the requests specific to RAH 40.

One should understand that this process as described for RAH 40 is applicable to all resources connected to RC 32.

If and when RAH 40 locates a request collected by RC 32 for access to VM 26 (which is the resource associated with RAH 40) (step 324) and collects the request to RAH 40, RAH 40 and/or VM 26 will prepare a one-time password (OTP) at step 326 for the associated request. VM 26 will then set or store this generated OTP as the current password for this particular request from SSOP 30 at step 328.

With the OTP generated and set as the current password for the associated request from SSOP 30, RAH 40 sends to RC 32 using the communication channel opened up between RC 32 and RAH 40 (step 330) a notice that RAH 40 is ready to accept incoming connections from system administrator 10.

Having received from RAH 40 the confirmation notice, RC 32 prepares a response payload (step 332) and sends the payload to SSOP 30 (step 334). The response payload contains a URL reference which SSOP 30 can connect to and download the generated OTP and other necessary connection information which may include a username. Note that the download from the URL is a one-time download connection so any potential hackers or snoopers cannot download the same information and utilize it to hack into VM 26. This will be explained further below.

At this point SSOP 30, in a preferred embodiment of the present invention, will automatically connect to the URL referenced in the payload (step 336). In the alternative, SSOP 30 may send a notification to system administrator 10 to click on an action icon to connect SSOP 30 to the URL. As is readily understood, SSOP 30 is a web app that is running within a browser so that SSOP 30 can connect to the URL. At step 338 the information, or file, in the URL, which SSOP 30 and associated browser has connected to, is downloaded. This file contains the generated OTP from RAH 40/VM 26 and associated username and/or other necessary login credentials.

Some browsers containing SSOP 30 have the capability to automatically run the program associated with the downloaded file. When this occurs the browser/SSOP 30 runs the associated program and passes the information contained in the file to the system administrator's server 12 as a command line argument. Otherwise the downloaded file is passed to system administrator's server 12 for processing in order to run the program.

If the file is passed to server 12 for processing, which will be the common occurrence, server 12 will need to contain an additional piece of software, namely a Remote Access Wrapper (RAW), which has been stored on server 12 previously. Each software RAW is associated with a respective one of the RAH, having been registered and compatible with that RAH to run the files which are downloaded from that RAH. Therefore, referring to the example thus far presented of the present invention, the RAW 42 stored on server 12 (as shown in FIG. 2) will be software appropriate to read and run the downloaded file from RAH 40/VM 26. SSOP 30 therefore sends the downloaded file to RAW 42.

RAW 42 decodes/interprets the information in the downloaded file and runs the necessary program stored therein to perform the remote access connection in step 342. Running the downloaded file gives server 12 one-time authentication data necessary to connect to VM 26. Running the downloaded software for access to VM 26 will occur in one of two ways, namely:

a. If the remote access protocol is RDP as outlined above, RAW 42 will create a remote desktop configuration file and run a Remote Desktop Client (which will already be present on server 12 if system administrator 10 utilizes RDP), passing a newly created remote access configuration to server 12 as a command-line parameter, whereupon server 12 connects through its browser to VM 26;

b. If the remote access protocol of server 12 is SSH, RAW 42 simply runs the "ssh" command and passes the acquired username and OTP to server 12 as command-line parameters.

Running the downloaded software with the downloaded information will cause server 12 to connect with VM 26 through the appropriate remote access protocol. Once this connection occurs, RAH 40 detects the successful access and immediately changes the associated account's OTP to a new OTP. This prevents any hacker or credential thief, in the unlikely event that the hacker/thief has intercepted the current OTP, from logging into VM 26.

It should be noted that the entire process described above with respect to the present invention relies upon the use of strong encryption at all times between all pieces of software and components that need to communicate and connect remotely with each other.

Aspects of the present invention may be implemented on other computing devices and/or distributed on multiple computing devices. Further, the aspects of the present invention may be implemented as computer-executable instructions stored by computer-readable media, also referred to as computer-readable storage media. As those skilled in the art will recognize, computer-readable media can host computer executable instructions for later retrieval and execution. When the computer-executable instructions stored on the computer-readable storage media are executed on computing devices, they carry out various steps, methods and/or functionality, including those steps, methods and routines described above in regard to method 300. Examples of computer-readable media include, but are not limited to: optical storage media such as Blu-ray discs, digital video discs (DVDs), compact discs (CDs), optical disc cartridges, and the like; disks, magnetic tape, and the like, memory storage devices such as random access memory (RAM), read-only memory (ROM), memory cards, thumb drives, and the like. For purposes of this disclosure, however, computer-readable media expressly excludes carrier waves and propagated signals.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned Detailed Description, the descriptions and illustrations of the preferred embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A method for a user to securely access a remote virtual machine (RVM), the method comprising:
   the user authenticating with a single sign-on portal (SSOP) wherein the SSOP is connected to a request collector, the request collector connected to a remote access helper (RAH), wherein the RAH is associated with the RVM;
   upon authentication by the user, the SSOP sends a request to the request collector wherein the request designates the RVM;
   the request collector collects the request from the SSOP and sends the request to the RAH associated with the RVM;
   upon obtaining the request, a one-time password (OTP) is generated by the RVM and the RAH sends an acceptance notice to the request collector;
   the request collector, upon receiving the acceptance notice, generates a payload containing a URL, and the request collector sends the payload to the SSOP;
   the SSOP connects to the URL and downloads a file containing the OTP, the SSOP sending the file to the user; and
   the user connects to and accesses the RVM using the OTP contained in the file.

2. A method according to claim 1 wherein the request collector is connected to at least one additional RVM and each of the at least one additional RVM has an associated RAH.

3. A method according to claim 2 wherein the request from the SSOP designates a specific one of the RVM and the at least one additional RVM and the request collector is connected with the RAH associated with the designated one of the RVM and the at least one additional RVM.

4. A method according to claim 1 wherein the OTP is further stored within the RVM.

5. A method according to claim 4 wherein the RAH changes the OTP after the RAH detects that the user has connected to the RVM.

6. A method according to claim 1 wherein the payload contains connection information.

7. A method according to claim 1 wherein the SSOP automatically connects to the URL upon receiving the payload.

8. A method according to claim 1 wherein the request collector is connected to at least one additional SSOP to receive requests therefrom.

9. A system that allows a user to securely access a remote virtual machine (RVM), the system comprising:
   a first server having a single sign-on portal (SSOP) application stored therein and connected to a request collector;
   the RVM having an associated remote access helper (RAH), the RAH connected to the request collector;
   wherein:
   upon authentication by the user, the SSOP sends a request to the request collector, the request designates the RVM;
   the request collector collects the request from the SSOP and sends the request to the RAH associated with the RVM;
   upon obtaining the request, a one-time password (OTP) is generated by the RVM and the RAH sends an acceptance notice to the request collector;
   the request collector, upon receiving the acceptance notice, generates a payload containing a URL, and the request collector sends the payload to the SSOP;
   the SSOP connects to the URL and downloads a file containing the OTP, the SSOP sending the file to the user; and
   the user connects to and accesses the RVM using the OTP contained in the file.

10. A system according to claim 9 wherein the request collector is connected to at least one additional RVM and each of the at least one additional RVM has an associated RAH.

11. A system according to claim 10 wherein the request from the SSOP designates a specific one of the RVM and the at least one additional RVM and the request collector is connected with the RAH associated with the designated one of the RVM and the at least one additional RVM.

12. A system according to claim 9 wherein the OTP is further stored within the RVM.

13. A system according to claim 12 wherein the RAH changes the OTP after the RAH detects that the user has connected to the RVM.

14. A system according to claim 9 wherein the payload contains connection information.

15. A system according to claim 9 wherein the SSOP automatically connects to the URL upon receiving the payload.

16. A system according to claim 9 wherein the request collector is connected to at least one additional SSOP to receive requests therefrom.

17. A computer-readable storage media storing computer-executable instructions which, when executed on a computing device including a processor for executing the instructions, carry out a method for a user to securely access a remote virtual machine (RVM), the method comprising:
   the user authenticating with a single sign-on portal (SSOP) wherein the SSOP is connected to a request collector, the request collector connected to a remote access helper (RAH), wherein the RAH is associated with the RVM;
   upon authentication by the user, the SSOP sends a request to the request collector wherein the request designates the RVM;
   the request collector collects the request from the SSOP and sends the request to the RAH associated with the RVM;
   upon obtaining the request, a one-time password (OTP) is generated by the RVM and the RAH sends an acceptance notice to the request collector;
   the request collector, upon receiving the acceptance notice, generates a payload containing a URL, and the request collector sends the payload to the SSOP;
   the SSOP connects to the URL and downloads a file containing the OTP, the SSOP sending the file to the user; and
   the user connects to and accesses the RVM using the OTP contained in the file.

18. A computer-readable storage media executing instructions according to claim 17 wherein the request collector is connected to at least one additional RVM and each of the at least one additional RVM has an associated RAH.

19. A computer-readable storage media executing instructions according to claim 18 wherein the request from the SSOP designates a specific one of the RVM and the at least one additional RVM and the request collector is connected with the RAH associated with the designated one of the RVM and the at least one additional RVM.

20. A computer-readable storage media executing instructions according to claim 17 wherein the OTP is further stored within the RVM and the RAH changes the OTP after the RAH detects that the user has connected to the RVM.

* * * * *